UNITED STATES PATENT OFFICE.

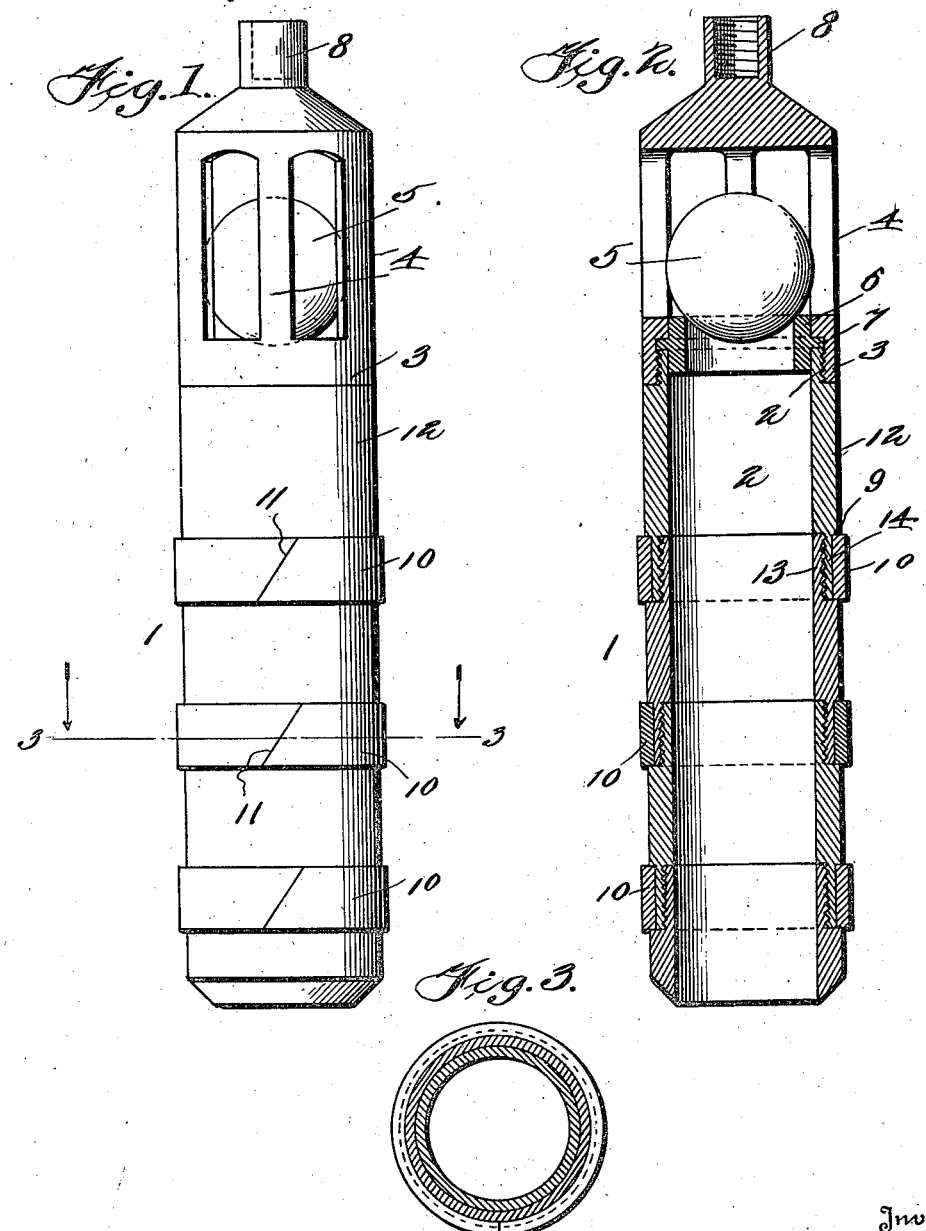

JAMES C. TIPPETT, OF OIL CITY, LOUISIANA.

WORKING-BARREL VALVE.

1,191,247.  Specification of Letters Patent.  Patented July 18, 1916.

Application filed May 10, 1915. Serial No. 27,180.

*To all whom it may concern:*

Be it known that I, JAMES C. TIPPETT, a citizen of the United States, residing at Oil City, in the parish of Caddo and State of Louisiana, have invented certain new and useful Improvements in Working-Barrel Valves; and I do hereby declare the following to be a full, clear, and exact description of the invention, such as will enable others skilled in the art to which it appertains to make and use the same.

The invention relates to a working barrel valve for oil wells.

The object of the present invention is to improve the construction of working barrel valves for oil wells and to provide a simple, practical and efficient working barrel valve designed particularly for use in wells where there is more or less sand likely to cause trouble and capable of operation in such wells without liability of becoming choked and adapted also to permit a rapid flow of the oil through it.

A further object of the invention is to provide a working barrel valve of this character equipped with cast iron packing rings and adapted to permit the same to be readily removed and replaced thereon without liability of being broken.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawing Figure 1 is a side elevation of a working barrel valve constructed in accordance with this invention, Fig. 2 is a longitudinal sectional view of the same, Fig. 3 is a transverse sectional view on the line 3—3 of Fig. 1.

Like numerals of reference designate corresponding parts in the several figures of the drawing.

In the accompanying drawing in which is illustrated the preferred embodiment of the invention, 1 designates a cylindrical body provided at its upper end with a reduced threaded portion 2 receiving the interiorly threaded lower end 3 of a cage 4 for a ball valve 5. The cage 4 which is of the ordinary construction operates to secure a valve seat 6 in position to coöperate with the ball valve 5. The valve seat which is of cylindrical form is provided with an exterior annular flange 7 which is clamped between the cage 4 and the upper end 2 of the body of the valve. The ball valve is adapted to permit a free flow of the oil through the cylindrical body 1 and the cage and it is not liable to become choked and inoperative by sand.

The upper end of the cage is provided with an integral shank or stem 8 which is interiorly threaded to enable the working body valve to be connected with operating means.

The body 1 is provided at intervals with annular grooves 9 for the reception of packing rings 10 which are preferably constructed of cast iron split at 11 as illustrated in Fig. 1 of the drawing. In order to enable the cast iron packing rings to be placed on and removed from the cylindrical body 1 without liability of breaking, the said body is composed of a plurality of sections 12 having male and female threaded portions 13 and 14 and forming a screw joint preferably of the width of the packing rings 10 but a screw joint of any other size may of course be employed. The packing rings reinforce the sectional body 1 at the joints and the joints enable the packing rings to be readily slipped on the body as they permit a separation of the sections at the joint so that the packing rings do not have to be expanded to the extent necessary to engage them with the grooves were the body 1 not constructed of sections. If the body were not constructed of sections it would be impossible to employ cast iron packing rings as they would be broken should an attempt be made to expand them sufficiently to enable them to be engaged with the grooves.

What is claimed is:—

1. A valve of the class described including a cylindrical body portion provided with exterior annular grooves arranged at intervals, said body portion being composed of sections having interfitting male and female portions located at the said grooves and forming separable joints to permit the sections to be separated at the said grooves, and annular packing arranged in the said grooves.

2. A valve of the class described including a cylindrical body provided with exterior annular grooves arranged at intervals, said body being composed of sections and having interfitting male and female portions located at the said grooves and forming separable joints to permit the sections to be separated at the said grooves and cast iron packing rings arranged in the grooves and adapted to be placed therein and removed therefrom when the sections are separated.

In testimony whereof I affix my signature in presence of two witnesses.

JAMES C. TIPPETT.

Witnesses:
    SAM STUBBLEFIELD,
    A. E. PYE.